Feb. 14, 1933.  A. HOFMANN ET AL  1,897,970
WIRE FEEDING AND CUTTING MACHINE
Filed Sept. 18, 1930  2 Sheets-Sheet 2

INVENTORS
Alfred Hofmann
Oswin Kanis
BY
Morrison, Kennedy & Campbell
ATTORNEYS

Patented Feb. 14, 1933

1,897,970

UNITED STATES PATENT OFFICE

ALFRED HOFMANN, OF PALISADE, AND OSWIN KANIS, OF LYNDHURST, NEW JERSEY, ASSIGNORS TO ALFRED HOFMANN NEEDLE WORKS, INC., OF UNION CITY, NEW JERSEY, A CORPORATION OF NEW JERSEY

WIRE-FEEDING AND CUTTING MACHINE

Application filed September 18, 1930. Serial No. 482,817.

This invention relates to improvements in wire-feeding and cutting machines adapted to produce wire blanks of predetermined length. It is particularly applicable for use in connection with a needle-making machine.

The present invention is in the nature of an improvement upon the wire-feeding and cutting mechanism constituting part of the apparatus disclosed in our prior Patent No. 1,696,484, granted to us December 25th, 1928. The machine disclosed in our patent is provided with cutting mechanism which cuts a needle blank from wire fed to the machine, the cutting mechanism comprising spaced pairs of cutter blades to cut the blank to predetermined length. This results in the discarding of a short piece of the wire which is wasted. In the mechanism referred to the length of the blank is determined by the distance between the pairs of cutter blades. Moreover, in the machine disclosed in the patent referred to, an initial transfer mechanism was provided for transferring the blank to the series of operating stations spaced along the bed-plate of the machine.

The present invention provides a single pair of cutter blades in lieu of the two disclosed in our prior patent. In order to insure uniform length of the blanks, our present invention provides positively actuated means for limiting the action of the feeding mechanism. Moreover, in our present invention we dispense with the initial transfer mechanism shown in our earlier patent, and by arrangement of the parts, as will hereinafter be described, it will be seen that the wire may be supported in the needle carrying jaws of the transfer mechanism during the cutting operation.

In order that our invention may be understood by those skilled in the art, we have appended hereto drawings showing the present preferred embodiment of our invention. It is to be understood, however, that these drawings are illustrative, merely, and that the invention is not limited to the details of construction therein disclosed. As will be readily appreciated the invention is susceptible of embodiment in other forms without sacrificing any of its advantages or departing from the scope thereof as defined in the appended claims.

Figure 1:
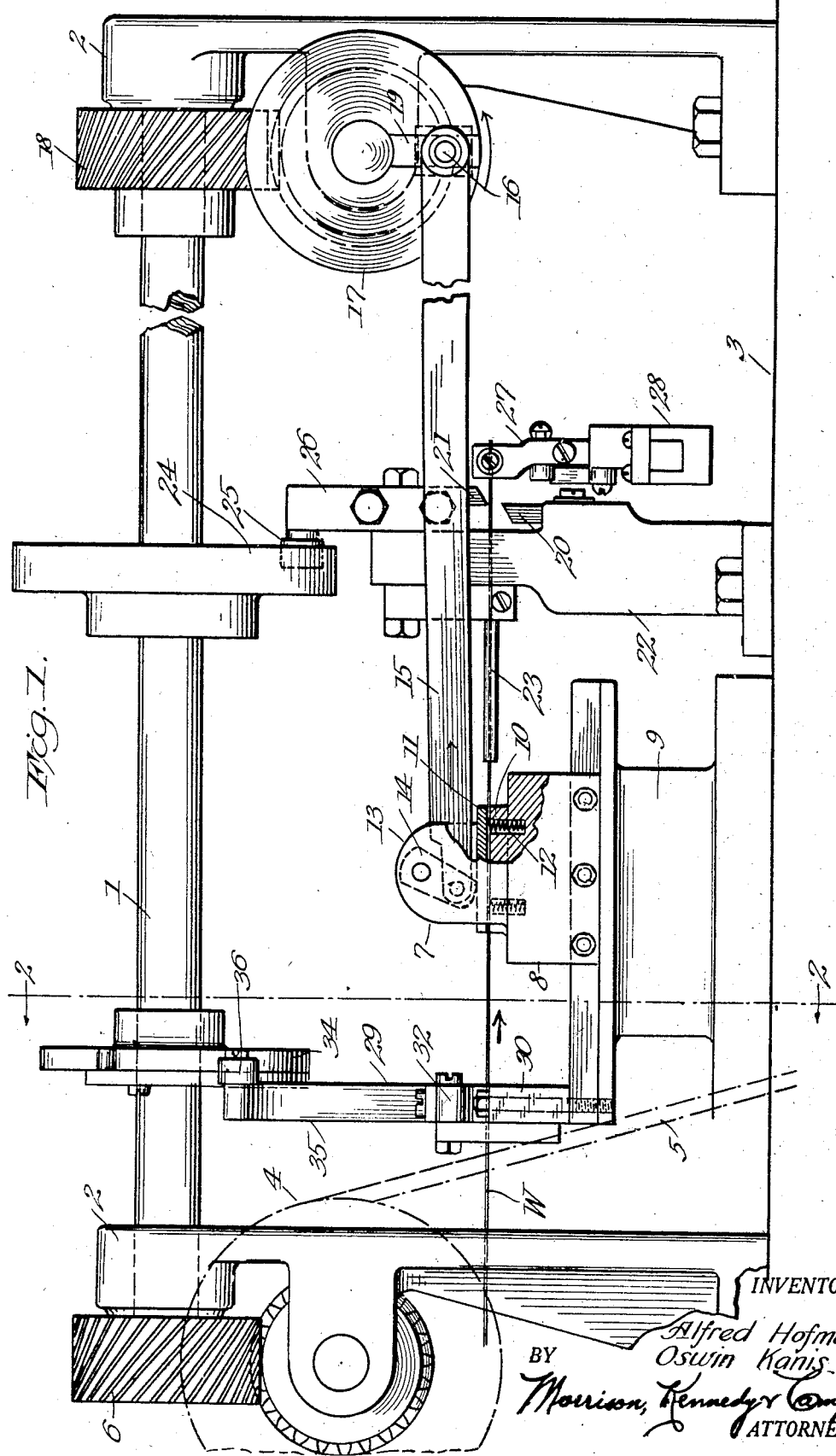
Figure 2:
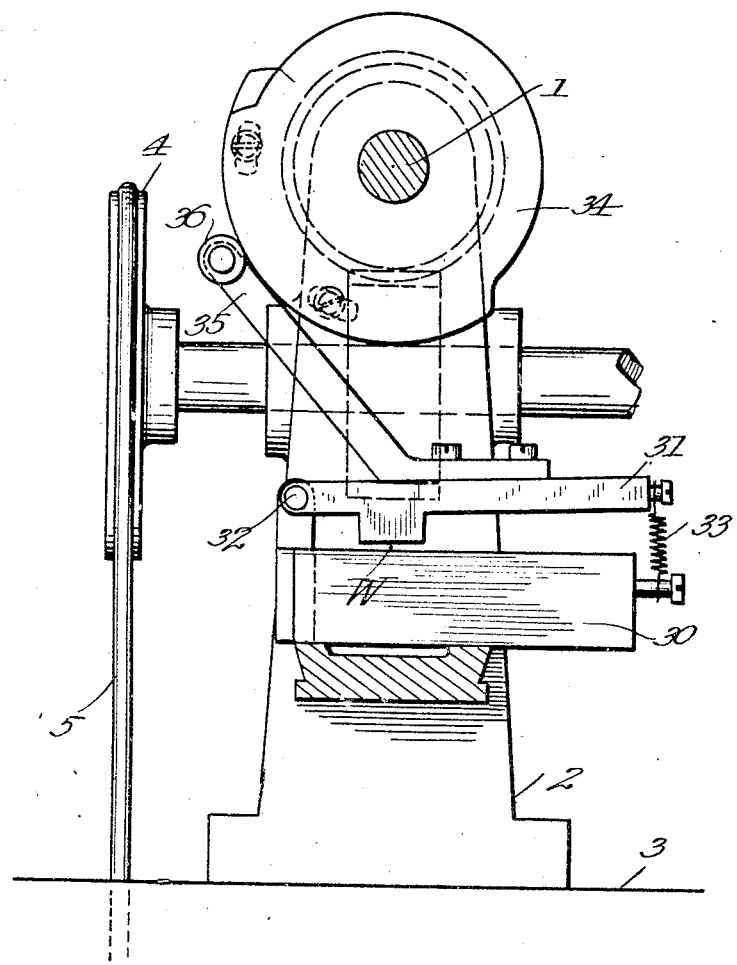

In these drawings:

Fig. 1 is a view in side elevation showing the wire-feeding and cutting mechanism according to our invention; and Fig. 2 is a sectional view taken on line 2—2 of Fig. 1 showing, particularly, the feed regulating mechanism.

Referring now to the drawings, the reference character 1 indicates a drive-shaft from which the several moving parts of the feeding and cutting mechanism receive their motion. This shaft is journaled in brackets 2, 2 suitably supported upon the machine base or bed-plate 3. The shaft 1 receives its motion from a pulley 4 driven by a belt 5 from any suitable part of the machine, suitable gearing 6 being provided to transmit motion from the pulley to the shaft.

Wire, indicated by the reference character W, is supplied to the machine from a reel (not shown), passing first through a wire straightening mechanism which it is deemed unnecessary to illustrate here but which may be of the same type as that disclosed in our Patent No. 1,696,484.

The feed mechanism, proper, comprises a wire drawing clamp, indicated generally by the reference character 7, which reciprocates transversely of the machine base, its motion being derived from the shaft 1 as will presently be described. The wire drawing clamp comprises a base member 8 which is slidably supported on a pedestal 9 mounted on the bed-plate of the machine. The clamp, proper, consists of a lower fixed plate 10 and an upper movable plate 11 which are normally kept open by means of suitable springs 12. As will be seen from an inspection of Fig. 1, the wire W passes between the plates 10 and 11.

Mechanism is provided for bringing the plates 10 and 11 together and at the same time moving the wire drawing clamp horizontally on the pedestal 9. This mechanism includes a suitable lug 13 to which is pivoted a link 14 which is of such length that upon movement in one direction it will bear against the upper plate 11 and force the same into contact with the lower plate 10, thus clamping the wire W between the plates. The link 14 is actuated by a lever 15 eccentrically mounted as at 16 upon a disc 17 which is rotated by the shaft 1 through suitable intermediate gearing 18. In order to assure accurate adjustment, the eccentric mounting 16 is adjustable in a slot 19 in the disc 17.

The cutting mechanism comprising a lower fixed cutter blade 20 and an upper movable cutter blade 21 which are brought together by the mechanism now to be described in order to cut from the wire W a blank of predetermined length. The lower fixed blade 20 is mounted in a bracket 22 suitably supported on the bed-plate 3. In entering the cutting mechanism the wire passes through a guide tube 23 secured to the bracket 22. The movable blade 21 receives its motion from the shaft 1 through a cam 24, which actuates a cam follower 25 secured to a bracket 26 in which the blade 21 is mounted, the bracket 26 having vertical sliding movement on the bracket 22.

During the cutting operation, the wire from which the blank is to be cut is supported in carrying jaws 27 which may constitute part of a needle transfer mechanism 28 of a needle making machine such as fully disclosed in our Patent No. 1,696,484 and it is believed that no further detailed description need be made here.

We will now describe that part of our improved feeding mechanism which insures the accurate feeding of predetermined lengths of the wire to the cutting mechanism. This mechanism is in the nature of a feed regulating device, indicated by the general reference character 29, and comprises a lower fixed plate 30 and an upper movable plate 31, these being hingedly connected at 32. As will be seen from an inspection of Fig. 2 the wire W passes between the plates 30 and 31 in its travel toward the cutting mechanism. Normally the plates 30 and 31 will be in close contact by reason of the weight of the plate 31 and the action of a suitable spring 33. During the actual feeding of the wire the plates will be separated and this separation is effected through a cam 34 on the shaft 1 which actuates an arm 35 secured to the plate 31. In Fig. 2 the plates are shown in open position permitting the free passage of the wire. As will be clear from an inspection of the drawings, when the high point of the cam 34 passes the cam roller 36 on the arm 35 the action of gravity and the spring 33 will force the plates together and thus prevent passage of the wire between them. It is obvious, of course, that the arrangement of the actuating mechanism for the plates 30 and 31 may be modified so that the cam will cause the closing of the plates against the pressure of the spring instead of opening them as disclosed in Fig. 2.

*Operation.*—The wire W enters the machine from the left, as viewed in Fig. 1, and is drawn in the direction of the arrow in that figure. As a preparatory step to the operation, the wire is passed through the space between the plates 30 and 31, then through the space between the plates 10 and 11, thence into the tube 23. The machine is then set into motion. Rotation of the shaft 1 causes rotation of the disc 17 with a corresponding movement of the lever 15 in the direction of the arrow thereon in Fig. 1. This movement of the lever 15 pivots the link 14, bringing its end into contact with the upper plate 11 of the clamping device so that the wire is securely held thereby. Continued movement of the lever 15 effects motion of the clamping device to the right, as viewed in Fig. 1, thus supplying the wire to the cutting mechanism. During this part of the operation, the plates 30 and 31 of the feed regulating device remain separated. When a predetermined length of wire has been advanced to the cutting mechanism the plates 30 and 31 are brought together, thus stopping the feed of the wire. Immediately thereafter the cam 24 actuates the upper movable cutter blade 21 which severs the wire to produce a blank of predetermined length. The other end of the wire is engaged by the needle carrying jaws 27 of the transfer mechanism 28 and is held therein during the cutting operation. Thereupon the lever 15 moves in the opposite direction. The link 14 is moved out of engagement with the plate 11 so that this plate is separated from the plate 10 by action of the springs 12. At the same time the cam 34 elevates the upper plate 31 of the regulating mechanism so that the machine is in position to repeat the operation.

It is believed that our invention will now be perfectly clear to those skilled in the art and that the advantages thereof will be readily apparent. It will be seen that we have provided a wire-feeding and cutting mechanism of simple construction which operates accurately to produce needle blanks of predetermined length, which blanks are subsequently transferred to various operating stations in the machine finally to produce a needle of any desired type.

What we claim is:

1. In wire-feeding and cutting machines, a wire-cutting mechanism, a wire-feeding mechanism, a feed-regulating mechanism adapted to periodically clamp and release the wire and regulate the length of wire presented to the cutting mechanism, the wire-feeding mechanism being disposed between the wire-cutting and feed-regulating mechanisms, and means actuating said mechanisms to present predetermined lengths of wire to the cutting mechanism.

2. In wire-feeding and cutting machines, a wire-cutting mechanism, a wire-feeding mechanism comprising a reciprocating carriage provided with wire-clamping elements, a feed-regulating mechanism adapted to periodically clamp and release wire and regulate the length of wire presented to the cutting mechanism, the wire-feeding mechanism being disposed between the wire-cutting and feed-regulating mechanisms, and means actuating said mechanisms to present predetermined lengths of wire to the cutting mechanism.

3. In wire-feeding and cutting machines, a wire-feeding mechanism, a feed-regulating mechanism comprising a hinged pair of clamping plates disposed transversely of the path of travel of the wire and normally in clamping engagement therewith, a power shaft provided with a cam, and an arm secured to one of the plates and provided with a portion engageable with the cam for periodically releasing the clamping plates until a predetermined length of wire has been fed by the wire-feeding mechanism.

4. In a machine for feeding wire, a reciprocating feed carriage provided with a pair of wire-clamping elements, a link pivoted on the carriage having a cam surface engageable with one of the wire-clamping elements, and actuating means connecting with the link to operate the clamping elements and cause movement of the feed carriage.

5. In a machine for feeding wire, a sliding feed carriage provided with a pair of wire-clamping elements, a cam engageable with one of the wire-clamping elements, and an actuating arm for causing the feed carriage to reciprocate and for actuating the cam to cause engagement of the clamping elements with the wire during the feeding stroke of the carriage.

6. In wire-feeding and cutting machines, a power shaft, a wire-cutting mechanism, a feed-regulating mechanism, and a wire-feeding mechanism disposed between and in alignment with the wire-cutting and feed-regulating mechanisms, said mechanisms being disposed longitudinally of the power shaft, cams on the power shaft, and actuating means associated therewith for operating the wire-cutting and feed-regulating mechanisms, and an arm having reciprocatory movement extending longitudinally of the power shaft and driven thereby for operating the wire-feeding mechanism.

In testimony whereof, this specification has been duly signed by:

ALFRED HOFMANN.
OSWIN KANIS.